UNITED STATES PATENT OFFICE.

WILLIAM L. FRAZIER, OF BOISE, IDAHO.

DIABETES REMEDY.

1,384,444.     Specification of Letters Patent.     Patented July 12, 1921.

No Drawing.     Application filed January 15, 1921. Serial No. 437,585.

*To all whom it may concern:*

Be it known that I, WILLIAM L. FRAZIER, a citizen of the United States, residing at Boise, in the county of Ada and State of Idaho, have invented certain new and useful Improvements in Diabetes Remedies; and I do hereby declare the following to be a full, clear, and exact description of the invention, such as will enable others skilled in the art to which it appertains to make and use the same.

The cause of diabetes as generally accepted by the medical profession has been that of a pancreatic lesion; it is upon this that the treatment of diabetes has been founded: This is an unstable foundation and a false premise to build on, it is so, because all individuals affected with diabetes do not have pancreatic lesions, and also the pancreatic lesions appear in individuals who do not have diabetes.

It is self evident that a disease cannot exist because of a certain lesion, when that certain lesion does not exist; therefore diabetes can not be dependent upon the pancreatic lesion, because a pancreatic lesion does not exist in every case of diabetes. This being true diabetes must be dependent upon some other cause.

All pathologists admit that the pancreatic lesion is not always present, for instance Opie in his second edition on *Diseases of the Pancreas*, page 318, states:—"On the one hand, all cases of diabetes are not accompanied by demonstratable lesions of the pancreas, and on the other hand, all lesions of the pancreas are not associated with diabetes." This is not the finding of Opie only, but is also the finding of every pathologist.

Thus the foundation of the present theory of the cause of diabetes being destroyed, we are compelled to look further for the cause.

Diabetes is necessarily due in each case to the same cause, and this cause must be demonstratable in each case.

If the cause is an infectious organism, it must conform to certain rules, these rules have been pointed out by Koch, and are in substance as follows:

1st. The organism must be isolated in pure culture.

2nd. In case of disease caused by infection, the same organism must be isolated in every case.

3rd. Must be able to produce the disease, by inoculating an animal with the isolated organism.

4th. The organism must be recovered from the inoculated animal.

On the other hand the reverse is true, if a certain organism can be isolated in pure culture, in each case of a certain disease and that certain organism introduced into an animal producing the same disease, and is isolated in pure culture from the animal in which the disease has been produced, then that organism is the cause of the disease.

I claim that I have isolated a certain and definite organism in pure culture, in each and every case of diabetes which I have examined for this said organism, and that the number of cases have been sixty-one.

That I have produced the same disease in a guinea-pig by inoculating it with the organism isolated from a diabetic individual, and that the same organism has been isolated from the guinea-pig in pure culture while it was affected with the disease.

Therefore I claim that the organism that produces diabetes is the organism that I have isolated from every case of diabetes examined, and with which I produced diabetes in the guinea-pig, from which guinea-pig the organism was again recovered.

Having by the above laws established that a certain organism is the causative agent of diabetes, an improved treatment of same is brought about by following the laws of Wright.

1st. A protective or curative serum may be produced from an organism by injecting a killed or attenuated organism or its toxic excreta into an animal, producing in the animal injected, antibodies or antitoxin against the infection.

2nd. Any bacteria responsible for any local disease and capable of isolation in pure culture may be employed in the form of a bacterial suspension, or bacterin to cure the disease it causes.

These laws of Wright are not applicable in the treatment of diabetes, except in the usage of the organism which I have discovered in and isolated from the diabetic, and it is by this discovery and isolation that I am preparing a serum and bacterin used as an improved and curative agent in diabetes.

The method of isolation which I have successfully employed is direct culture from the patient's blood preferably in dextrose broth or bouillon, usually requiring an incubation period of from three days to two weeks, at a temperature of thirty-seven degrees centigrade.

The organism may be identified as a bacillus, approximately three to seven microns long and one to two microns in width. It is an aerobe, growing equally well on plain agar, potato agar, or egg agar, without characteristic size, shape, or color of colonies. It is non-motile, sporulates, and grows singly or in clumps. It is acid forming. It stains readily with Romanowsski's methylene blue, carbol-fuchsin and Wright's stain, probably most clearly with Wright's. It is gram-positive.

For the treatment of diabetes mellitus, or for immunizing individuals against this disease, I have prepared the following:

1st. A blood serum charged with antibodies against the aforesaid organism, and with an antitoxin, which is intended to be injected intravenously, subcutaneously or hypodermically into the patient.

2nd. A fluid suspension of killed organisms isolated from diabetic individuals, a vaccin, which is to be used in the manner in which vaccins are usually used.

These products may be produced by standard practice or technique relating to the production of serums or antitoxins and bacterins, or by approved modifications of same.

Thus, the first mentioned product may be made by injecting the killed, attenuated, or live organisms and their excreta cultured from diabetic individuals into the animal from which the serum is desired. The resistance of the injected animal is raised against this organism by the production of antibodies and antitoxin against said organism. When the animal's blood is sufficiently charged with the antibodies and antitoxin, a portion of the blood is drawn and the serum content of the drawn blood is separated for use as a blood serum as before indicated.

The second named product or vaccin is made by washing cultures of the aforesaid organism from the medium with normal salt solution, or other fluid vehicles, thus procuring a suspension of the living organisms in the saline solution or by growing the organism in a medium which may be used as a vehicle.

The suspension is then heated to sixty degrees centigrade for thirty minutes, and then cooled for the same period of time. This heating and cooling process is repeated three or more times, sufficient water being added to the suspension to account for the loss by evaporation of the fluid content of the suspension. A variable amount of tricresol or other germicide is then added to the suspension, usually sufficient to make a one-half per cent. solution. The heating and the germicide kill all the organisms. The killed organisms are then counted in a counting chamber and are ready for use as a vaccin. The administration is started in hypodermic injections from ten thousand to a hundred thousand millions of organisms, the dose being repeated every three or four days and increased one hundred million or more as desired by the physician until one thousand millions or more are taken at each dose.

In treating diabetic individuals, the products described may be used conjointly or separately, or they may be mixed and injected together, or may be injected separately, and either may be administered first.

The blood serum acts directly upon the diabetic organism in the individual under treatment to destroy said organism and their toxins, while the second product, which is a suspension of killed organisms and its excreta in fluid, brings up the resistance of the diabetic, causing a production of antibodies and antitoxin within his body.

It is understood that the present invention is not restricted to any specific methods or technique in preparing the preparation from the newly discovered organism aforesaid.

Having thus described my invention, what I claim as new and desire to secure by Letters Patent of the United States is:

1. A medicinal preparation for the treatment of diabetes mellitus derived from a culture of the organism causative of the said disease.

2. A medicinal preparation for the treatment of diabetes mellitus comprising a fluid suspension of the killed organisms causative of the said disease.

In testimony whereof I affix my signature in the presence of two witnesses.

WILLIAM L. FRAZIER.

Witnesses:
R. M. McCracken,
Elbert S. Delana.